United States Patent [19]

Shimada et al.

[11] Patent Number: 6,104,995
[45] Date of Patent: *Aug. 15, 2000

[54] SPEAKER IDENTIFICATION SYSTEM FOR AUTHORIZING A DECISION ON AN ELECTRONIC DOCUMENT

[75] Inventors: Takashi Shimada; Masanori Mochizuki; Masahiro Yuzurio; Kiyofumi Akita; Shigeru Idei, all of Kawasaki; Akira Suzuki, Yokohama, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,551

[22] Filed: Mar. 19, 1997

[30] Foreign Application Priority Data

Aug. 30, 1996 [JP] Japan .................................. 8-229862

[51] Int. Cl.[7] .................................................. G10L 17/00
[52] U.S. Cl. ........................ 704/270; 704/273; 704/276; 704/246
[58] Field of Search ..................... 704/246–250, 704/243–245, 273, 276, 270

[56] References Cited

U.S. PATENT DOCUMENTS

| | | | |
|---|---|---|---|
| 4,297,528 | 10/1981 | Beno | 704/244 |
| 4,581,755 | 4/1986 | Sakoe | 704/247 |
| 4,653,097 | 3/1987 | Watanabe et al. | |
| 4,694,493 | 9/1987 | Sakoe | 704/247 |
| 4,885,777 | 12/1989 | Takaragi et al. | 380/30 |
| 5,123,049 | 6/1992 | Koyama | 704/243 |
| 5,450,524 | 9/1995 | Rissanen | 704/243 |
| 5,751,904 | 5/1998 | Inazumi | 704/246 |
| 5,872,848 | 2/1999 | Romney et al. | 380/25 |

FOREIGN PATENT DOCUMENTS

| | | |
|---|---|---|
| 0 444 351 | 9/1991 | European Pat. Off. . |
| 2-310663 | 12/1990 | Japan . |
| 8-84190 | 3/1996 | Japan . |
| 2 224 773 | 5/1990 | United Kingdom . |
| PCT/US91/ 04321 | 1/1992 | WIPO .................... 704/245 |
| 95/18441 | 7/1995 | WIPO . |

*Primary Examiner*—David R. Hudspeth
*Assistant Examiner*—Abul K. Azad
*Attorney, Agent, or Firm*—Staas & Halsey LLP

[57] ABSTRACT

A principal identification system, approval system and recording medium store a plurality of different voice patterns corresponding to a plurality of persons. The voice patterns are stored in correspondence with respective identification codes. One of the identification codes is selected and displayed on a screen by a computer, and then the inputted voice is collated with a voice corresponding to the selected identification code. Next, an identification is made upon a detection of a coincidence.

17 Claims, 16 Drawing Sheets

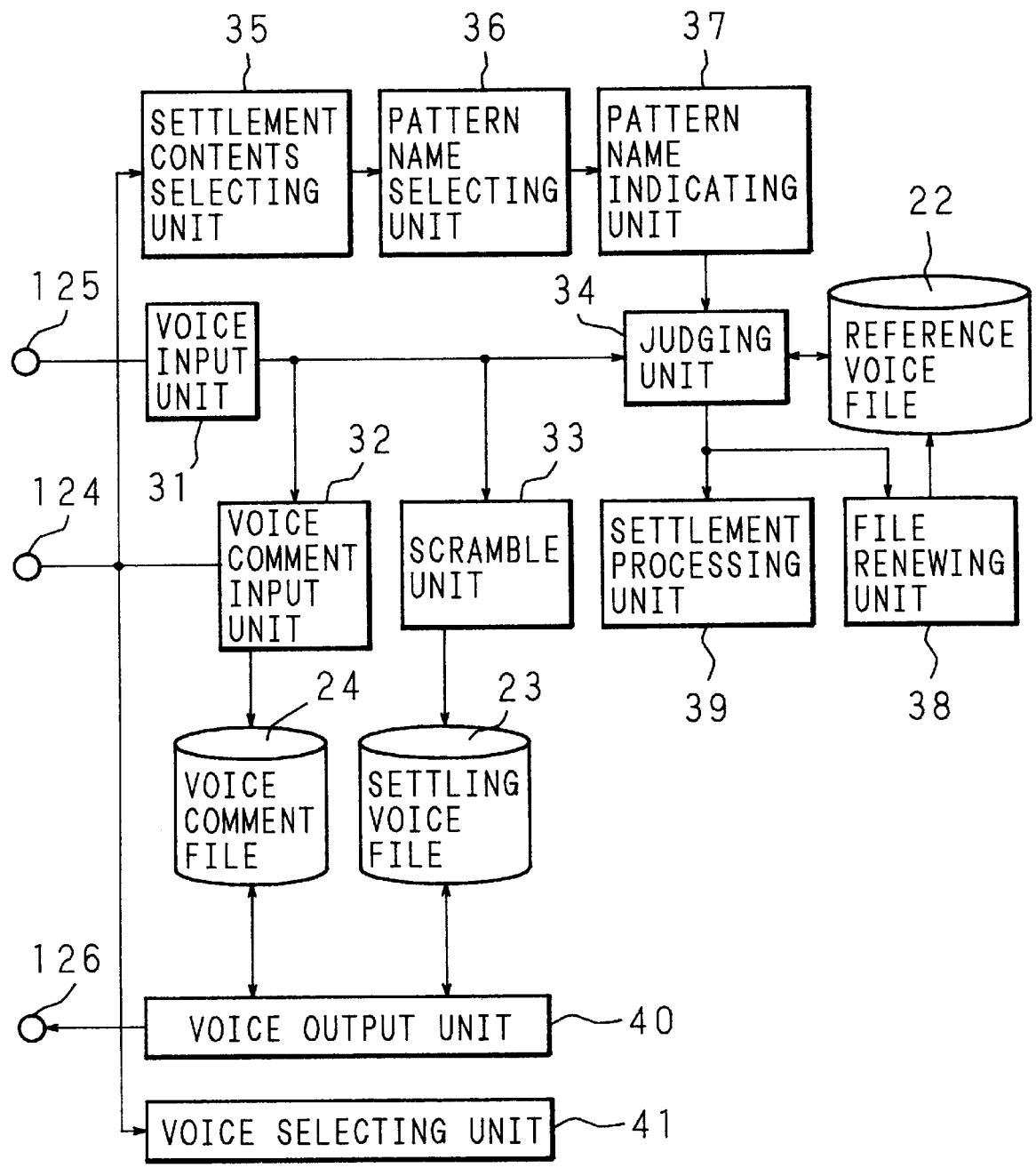

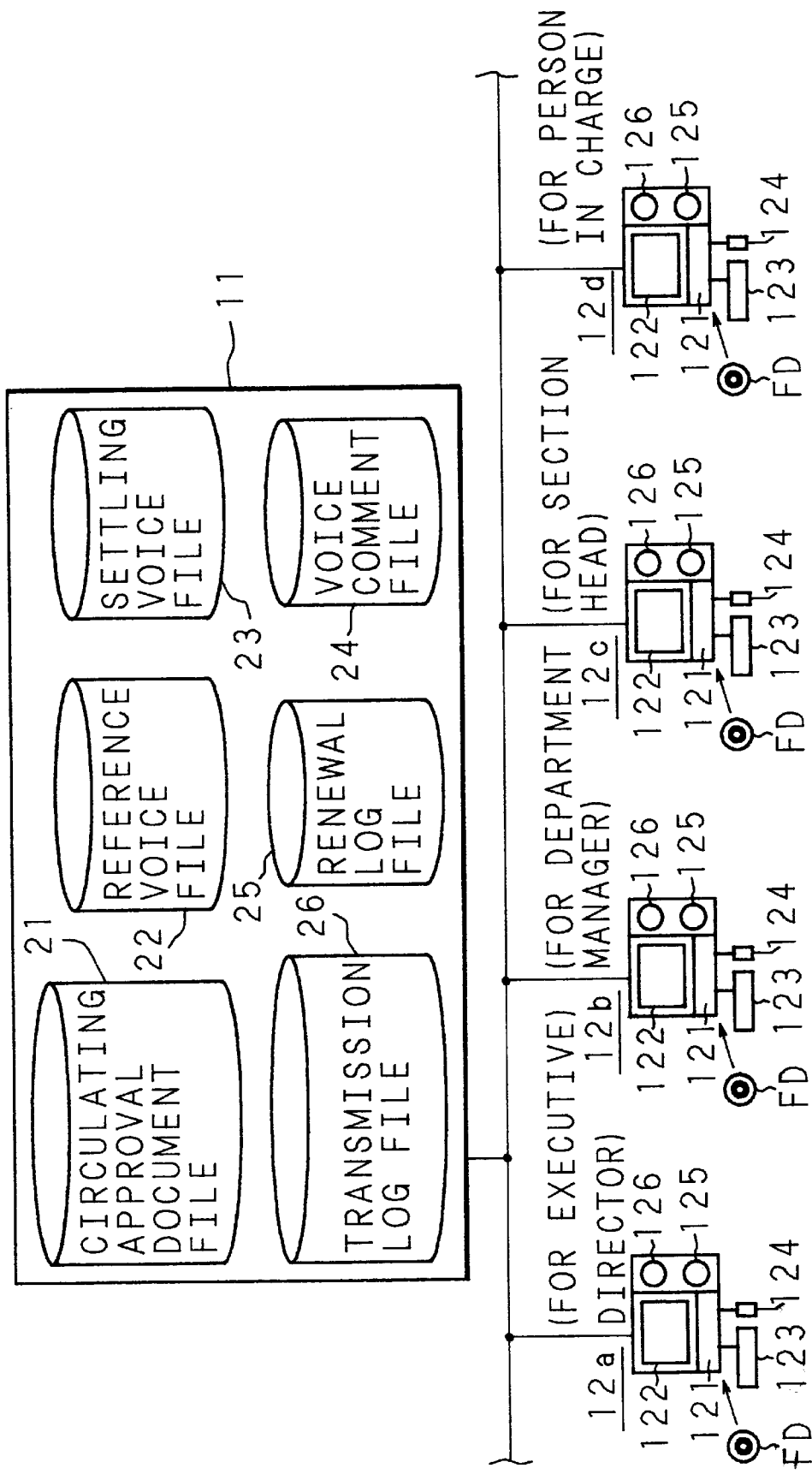

FIG. 3

21 CIRCULATING APPROVAL DOCUMENT FILE

| | | | SSA | | |
|---|---|---|---|---|---|
| NSA | CIRCULATING APPROVAL DOCUMENT NUMBER | 3456 | CIRCULATING APPROVAL ITEM NAME | PURCHASE OF··· | |
| PSA | SETTLING PERSON | | | | |
| PTN | PATTERN | | | | |
| FSD | SETTLING VOICE FILE NAME | | | | |
| TAP | SETTLING DATE | | | | |
| FCO | VOICE COMMENT FILE NAME | | | | |
| CSA | CIRCULATING APPROVAL CONTENTS | BECAUSE IT IS NECESSARY TO DEVELOP APPLICATION PACKAGE | | | |
| ASA | SETTLED AMOUNT | 10,000,000YEN | | | |
| DDR | DRAFTING DEPARTMENT | ○○SYSTEM DEPARTMENT | | | |
| NDR | PERSON IN CHARGE OF DRAFTING | ○○ ○○ | | | |
| | | | | | |

FIG. 4

22 REFERENCE VOICE FILE

| EMPLOYEE NUMBER NEM | PATTERN CONTENTS CPT | REGISTRATION DATE TRG | RENEWAL DATE TRN |
|---|---|---|---|
| PATTERN PTN | | | |
| APPROVAL1 | APPROVAL1 | 96.08.17.11/23/17 | 96.08.19.11/23/34 |
| APPROVAL2 | APPROVED BY SHIMADA | 96.08.17.11/23/17 | 96.08.19.16/11/45 |
| APPROVAL3 | APPROVE | 96.08.17.11/23/17 | 96.08.20.14/28/47 |
| REJECTION1 | REJECTION1 | 96.08.17.11/23/17 | 96.08.19.15/24/06 |
| REJECTION2 | REJECTED BY SHIMADA | 96.08.17.11/23/17 | |
| REJECTION3 | REJECT | 96.08.17.11/23/17 | |

FIG. 5

23 SETTLEMENT VOICE FILE

| | | TAP |
|---|---|---|
| CIRCULATING APPROVAL DOCUMENT NUMBER | 3456 | |
| EMPLOYEE NUMBER | 12345 | SETTLING DATE | 96.08.20.14/28/47 |
| SETTLING VOICE | APPROVE | |

NSA — CIRCULATING APPROVAL DOCUMENT NUMBER
NEM — EMPLOYEE NUMBER
SDC — SETTLING VOICE

FIG. 6

24 VOICE COMMENT FILE

| CIRCULATING APPROVAL DOCUMENT NUMBER | 3456 | SETTLING DATE | 96.08.20.14/28/47 |
|---|---|---|---|
| EMPLOYEE NUMBER | 12345 | | |
| COMMENT | I THINK THAT THIS ITEM MUST BE PROCESSED AS SOON AS POSSIBLE TO CARRY OUT. | | |

NSA — CIRCULATING APPROVAL DOCUMENT NUMBER
NEM — EMPLOYEE NUMBER
SCO — COMMENT
TAP — SETTLING DATE

FIG. 7

25 RENEWAL LOG FILE

| EMPLOYEE NUMBER | 12345 | |
|---|---|---|
| RENEWAL DATE | PATTERN | CIRCULATING APPROVAL DOCUMENT NUMBER |
| 96.08.19.17/07/51 | APPROVAL PATTERN 1 | 3455 |
| 96.08.20.14/28/47 | APPROVAL PATTERN 3 | 3456 |

NEM — EMPLOYEE NUMBER
PTN — PATTERN
NSA — CIRCULATING APPROVAL DOCUMENT NUMBER
TRN — RENEWAL DATE

FIG. 8

26 TRANSMISSION LOG FILE

| CIRCULATING APPROVAL DOCUMENT NUMBER | | | 3456 | | | |
|---|---|---|---|---|---|---|
| POST | NAME | EMPLOYEE NUMBER | SETTLING DATE | PATTERN | APPROVAL/ REJECTION | VOICE ABNORMALITY FLAG |
| CHIEF | ○○ | 11234 | 96.08.19.10/16/30 | APPROVAL 2 | APPROVAL | |
| SECTION HEAD | ○○ | 12345 | 96.08.20.14/28/47 | APPROVAL 3 | APPROVAL | |
| | | | | | | |
| | | | | | | |
| | | | | | | |

PST  NSA  NME  NEM                         TAP        PTN          GDC        GEX

REFERENCE VOICE REGISTERING SCREEN

EMPLOYEE No. 12345 — NEM

PTN
- APPROVAL VOICE(1)  ◇REGISTERED      1996.06.24.10/00/00 — TRG
- APPROVAL VOICE(2)  ◇REGISTERED      1996.06.24.10/02/15
- APPROVAL VOICE(3)  ◇NOT REGISTERED   /   /   /
- REJECTION VOICE(1) ◇NOT REGISTERED   /   /   /
- REJECTION VOICE(2) ◇NOT REGISTERED   /   /   /
- REJECTION VOICE(3) ◇NOT REGISTERED   /   /   /

HG1

SPEAK PASSWORD WITHIN 3 SECONDS.

FIG. 11 CIRCULATING APPROVAL DOCUMENT MAKING SCREEN

| | | | | | | PURCHASE OF... |
|---|---|---|---|---|---|---|
| | CIRCULATING APPROVAL DOCUMENT NUMBER | 3456 | | CIRCULATING APPROVAL ITEM NAME | | |
| | SETTLING PERSON | | EXECUTIVE DIRECTOR | DEPARTMENT MANAGER | SECTION HEAD | |
| | SETTLEMENT CONDITION | | | | | |
| | SETTLING DATE | | ../.. | ../.. | ../.. | |
| | VOICE COMMENT | | | | | |
| | CIRCULATING APPROVAL CONTENTS | BECAUSE IT IS NECESSARY TO DEVELOP APPLICATION PACKAGE | | | | |
| | SETTLED AMOUNT | 10,000,000YEN | | | | |
| | DRAFTING DEPARTMENT | ○○SYSTEM DEPARTMENT | | | | |
| | PERSON IN CHARGE OF DRAFTING | ○○ ○○ | | | | |

FIG. 12

SETTLEMENT PROPOSED ITEM LIST SCREEN

| SETTLEMENT PROPOSED ITEM LIST | | | | |
|---|---|---|---|---|
| CIRCULATING APPROVAL DOCUMENT NUMBER | CIRCULATING APPROVAL ITEM NAME | SETTLED AMOUNT | LAST SETTLING PERSON | FINAL SETTLEMENT DATE |
| ◇1122 | DISCARDING OF... | 15,000,000 | SECTION HEAD... | 96.08.24.12/00/10 |
| ◇3456 | PURCHASE OF... | 10,000,000 | SECTION HEAD... | 96.08.24.12/10/11 |
| ◇3467 | CONTRACT OF... | 5,000,000 | SECTION HEAD... | 96.08.24.13/45/30 |

NSA  SSA  HG3  ASA  NJB  TFN

FIG. 13

| | | CIRCULATING APPROVAL ITEM NAME | | PURCHASE OF... |
|---|---|---|---|---|
| NSA → | CIRCULATING APPROVAL DOCUMENT NUMBER | 3456 | | |
| | | EXECUTIVE DIRECTOR | DEPARTMENT MANAGER | SECTION HEAD |
| PSA → | SETTLING PERSON | | | |
| CDT → | SETTLEMENT CONDITION | | APPROVAL/ REJECTION | VOICE APPROVAL BY SECTION HEAD... |
| TAP → | SETTLING DATE | ..// | ..// | 96.08.24.12/10/11 |
| COM → | VOICE COMMENT | | | COMMENT OF 20 SECONDS |
| | CIRCULATING APPROVAL CONTENTS | BECAUSE IT IS NECESSARY TO DEVELOP APPLICATION PACKAGE | | |
| | SETTLED AMOUNT | 10,000,000YEN | | |
| | DRAFTING DEPARTMENT | ○○SYSTEM DEPARTMENT | | |
| | PERSON IN CHARGE OF DRAFTING | ○○ ○○ | | |

HG4

WD11: NOT IDENTIFIED

BT11: SPEAK APPROVAL PATTERN3

BT12: SPEAK VOICE COMMENT

SETTLEMENT SCREEN

SPEAKER IDENTIFICATION SYSTEM FOR AUTHORIZING A DECISION ON AN ELECTRONIC DOCUMENT

BACKGROUND OF THE INVENTION

The present invention relates to a speaker identification system for identifying by voice whether a speaker is authorized to make a decision on a subject wherein a prospective speakers' voices are previously registered with respective identification codes. The present invention also relates to a recording medium for use in the speaker identification system.

Various proposals have been made for an electronic system to make settlement by circulating an electronic document to plural managers for their approval via computers connected by a network. An electronic settlement system is an improvement over a conventional system of obtaining approval by circulating a sheet of paper through plural supervisors. Settlement is the system of identifying by voice whether a decision maker is authorized with respect to a particular subject. Whether such an electronic settlement system comes to success or not depends largely on the reliability and operability of the system, and improvement of such system is desired for its effective operation.

In the conventional electronic settlement system, the person desiring to make settlement, i.e. the settling person, starts up a computer, and at first inputs a personal ID code and password with a keyboard or the like. When the inputted ID code and password are genuine, the system accepts them and allows the operator to proceed to the next step.

The person making settlement next displays a document to be settled on a screen with a keyboard or a mouse, selects the contents as to the approval or rejection, and pushes a specified key so as to input the result on confirmation. As a result, the illustration of the seal registered in advance is displayed on the related settlement column.

In such conventional electronic settlement system, a password supports the reliability of the system and determines whether the settling party is the genuine person or not, i.e. whether the principal has really made settlement by his own will or not. Therefore, as far as the password performs the original function, reliability can be secured.

However, it can sufficiently occur in daily practice that the password is stolen or unduly used, and in this respect the reliability of the electronic settlement system leaves a question.

Moreover, due to the sophistication of the operations of a keyboard or mouse for actuating the electronic settlement system, including the inputs of ID code and password, the system is less easily usable for those who are not accustomed to the operation of the electronic apparatuses and the system is apt to be averted.

There is also proposed a system to substitute voice for the keyboard or mouse operation for identification (Japanese Patent Application Laid-Open No. 2-310663(1990)).

In this system, it may be conceivable that, in order to identify whether the settling person is genuine or not, the voice of the settling person is registered in advance. The system then collates the voiceprints of the inputted voice and the registered voice in making settlement. However, even in the case of carrying out such voiceprint collation, there can be a case for a third person to record by stealth the voice of the settling person and reproduce it so as to make an illegal settlement. Therefore, the reliability of the system is still not sufficient.

BRIEF SUMMARY OF THE INVENTION

The present invention has been made to solve the problems as discussed above. An object of the present invention is to provide a system for identifying a principal in which the operation is made easy by identifying by voice whether the person is a genuine subject or not, to carry out identification of the principal with assurance by eliminating the possibility for illegal data entry to the utmost extent, thereby making it possible to improve reliability and operability. An electronic settlement system and a recording medium may used therefor.

A principal identification system according to the present invention is characterized in that a plurality of different voice patterns on each person are registered in correspondence with different identification codes, a computer proposes one of the identification codes by selection, and collates the inputted voice with the voice corresponding to the selected identification code which is already registered to judge whether they coincide with each other.

In carrying out collation by voice, input of a voice of any of the plural patterns of voice registered in advance is required, so that it is possible to exclude the possibility of a third person to enter illegally to the utmost extent. Accordingly, as the identification to be the principal is steadily made, reliability is improved. In addition, due to the use of voice, frequency of operation of keyboard or mouse is reduced, and the system operation is easy.

In an electronic settlement system according to the present invention, settlement processing is carried out by a settlement processing means when the operator is identified to be a principal in this way.

Accordingly, the possibility for the third person to carry out the settlement illegally can be eliminated to the utmost extent, and the reliability of the system is improved.

Furthermore, the electronic settlement system comprises a settling voice file for storing, according to the contents required to be settled, the voice of the settling person inputted at the time of the settlement in correspondence with the identification code; settling voice output means for outputting by voice the contents of the settling voice file; and settling voice selection means for selecting and instructing the voice to be outputted to the settling voice output means. By this system, it is possible to ascertain easily that the contents of the settlement adopted by the person prior to the case were correct.

Furthermore, the system is provided with scrambling means for scrambling in correspondence with the time of settlement and storing, in storing the voice of the settling person in the settling voice file. In this case, even in case of the settling voice in store having been illegally copied, its normal reproduction is almost impossible. Therefore, high reliability is obtainable.

Furthermore, the system is provided with file renewal means for renewing the voice in the reference voice file by the inputted voice of the settling person, in case the processing is made by the settlement processing means. By this system, a possibility to make the collation impossible because of the change of the settling person's voice by time is reduced, and even if the old voice is copied, its illegal use can be prevented. Furthermore, the labor for periodically renewing the voice in the reference voice file can be saved.

A recording medium according to the present invention is characterized by having the program for executing the steps mentioned above in record.

Further, a recording medium according to the present invention is characterized by having in record the program coding means that can be read by the computer for executing the above steps.

A typical example utilizing the system of the present invention is a board meeting on a network in which the corporate rules and important decisions are made including top-secret information. Prior to obtaining the final decision of a meeting topic, the authorization of the decision-maker (speaker) must be checked whether it is genuine. According to the present invention, the system includes: (1) each prospective speaker is registered by different voice patterns with respective identification codes; (2) one of the identification codes is selected for a command to a computer; (3) a speaker's voice corresponding to the selected identification code is input (to the system) as an inputted voice pattern; and (4) the inputted voice pattern is checked to see whether it is registered.

The above and further objects and features of the invention will more fully be apparent from the following detailed description with accompanying drawings.

BRIEF DESCRIPTION OF THE SEVERAL VIEWS OF THE DRAWING

FIG. 1 is a block diagram showing a part of an electronic settlement system of the present invention;

FIG. 2 is a block diagram of the electronic settlement system according to the present invention;

FIG. 3 is a view showing a constitution of a circulating sanction statement file;

FIG. 4 is a view showing a constitution of a reference voice file;

FIG. 5 is a view showing a constitution of a settling voice file;

FIG. 6 is a view showing a constitution of a voice comment file;

FIG. 7 is a view showing a constitution of a renewal log file;

FIG. 8 is a view showing a constitution of a transported log file;

FIG. 11 is a view showing a screen for making a circulating approval document;

FIG. 12 is a view showing a screen of a list of the subjects to be settled;

FIG. 13 is a view showing a screen for settlement;

DETAILED DESCRIPTION OF THE INVENTION

Figure 9:
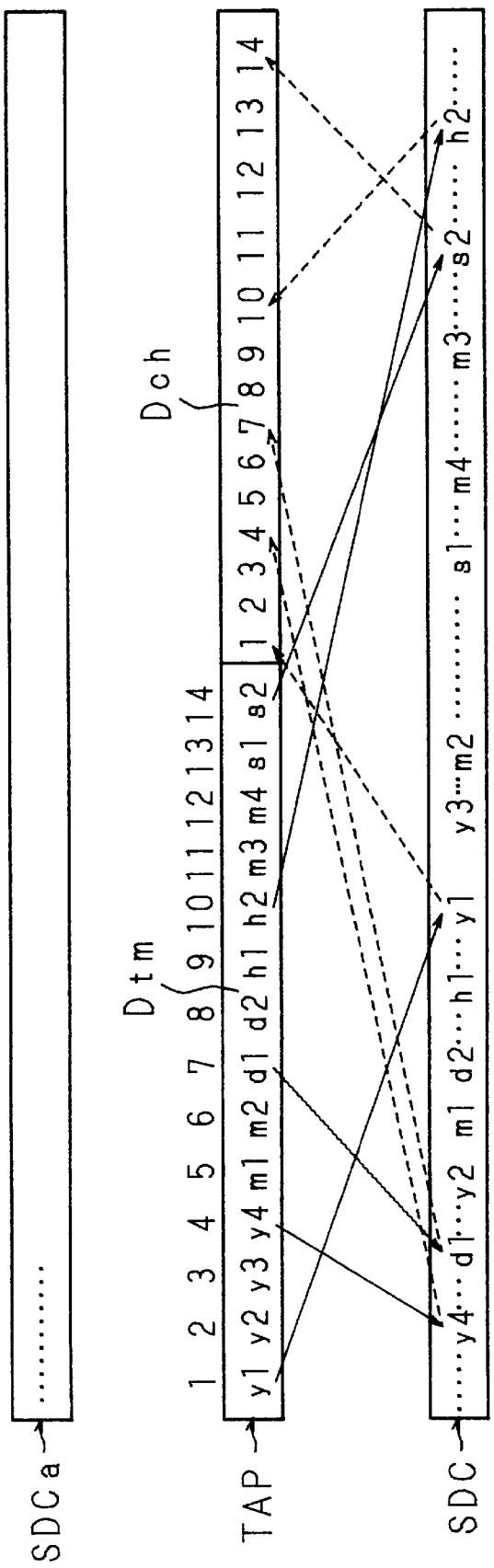
FIG. 9 is a view showing a scramble processing.

Hereinafter, the present invention is described in detail with reference to the drawings showing the embodiments thereof.

Based on FIG. 1, which is a functional block diagram, an electronic settlement system of the present invention is explained. The electronic settlement system 1 is furnished with a voice input unit 31, a voice comment input unit 32, a scramble unit 33, a judging unit 34, a settlement contents selecting unit 35, a pattern name selecting unit 36, a pattern name indicating unit 37, a file renewing unit 38, a settlement processing unit 39, voice output unit 40, and a voice selecting unit 41.

The voice input unit 31 converts a voice signal inputted from a microphone 125 to a digital voice signal in a predetermined timing. The voice input unit 31 as well as the microphone 125 composes a voice input means of the present invention. When the inputted voice signal is a voice comment, the voice comment input unit 32 writes the voice signal from the voice input unit 31 in the voice comment file 24. The indication as to whether the inputted voice signal is a voice comment or not is carried out for example by settling person PSA not shown by operating a mouse 124. The voice comment input unit 32 corresponds to the comment input command means of the present invention. The scramble unit 33 applies scramble corresponding to the date of settlement TAP to the voice signal in storing the settling voice SDC, given from the voice input unit 31, in the settling voice file 23. The scramble unit 33 corresponds to scramble means of the present invention.

When the settling person PSA inputs a voice password as the inputted voice signal, the judging unit 34 refers to a reference voice file 22, and judges whether or not the inputted voice password coincides to a reference voice pattern, namely the pattern contents CPT of a pattern name PTN designated by the system within a permissible range, by voiceprint collation. Of course, the voice password may in actuality be more then one spoken word. The judging unit 34 corresponds to judging means of the present invention. The settlement contents selecting unit 35 is to select a command of the settled contents, i.e., either "approved" or "rejected", in making settlement of the pending matter for approval by plural managers by circulation. The command of the settlement contents is given by the settling person PSA by operating the mouse 124. The settled contents selecting unit 35 corresponds to a settlement contents selecting means of the present invention. When a command of the settled contents is selected by the settling person PSA, the pattern name selecting unit 36 selects one pattern name PTN randomly out of the plural pattern names PTN corresponding to the selected command. The pattern name indicating unit 37 displays the selected pattern name PTN on a screen HG so as to enable the settling person PSA to recognize the pattern name, and also gives the pattern name to the judging unit 34. The pattern name PTN corresponds to an identification code of the present invention. The pattern name indicating unit 37 corresponds to the identification code output means in the present invention.

When the judging unit 34 judges that the voice signal inputted in response to the displayed pattern name PTN is the voice password corresponding to the selected pattern name PTN (selected by pattern name selecting unit 36), the file renewing unit 38 renews the contents of the reference voice file 22 by storing the inputted voice password of the settling person PSA on the basis of a signal from the judging unit 34. The file renewing unit 38 corresponds to file renewing means in the present invention. When the judging unit 34 judges that the inputted voice signal is the voice password corresponding to the reference voice pattern, i.e. selected pattern name PTN, and that the person who has issued the inputted voice signal is the principal, the settlement processing unit 39 carries out processing by taking that the settlement has been given on the selected contents of settlement. The settlement processing is, for example, the process wherein settlement contents are written in a circulating approval document file 21, the letters or illustration to the effect that the settlement has been made are displayed on the screen HG, or the name of the circulating approval document is deleted from the list of the settlement items settled by the settling person on his screen and added to the list of the settlement items to be settled by the next settling person on his screen. The settlement processing unit 39 corresponds to settlement processing means of the present invention.

The voice selecting unit 41 selects the settling person relating to the voice data to be outputted and instructs voice output unit 40 to output the corresponding voice data. A command is then given by the settling person PSA to initiate receipt of the voice data by operating the mouse 124. The voice selecting unit 41 corresponds to settling voice selecting means of the present invention. Under this command, the voice output unit 40 reads out the contents of the settling voice file 23, i.e. a reference voice pattern, or the contents of the voice comment file 24, i.e. A voice comment, and outputs the voice data by as a voice through a speaker 126. The voice output unit 40 corresponds to settling voice output means and voice comment output means of the present invention.

Such an electronic settlement system 1 is constituted for example as a server/client system. The functions mentioned above are realized by executing the programs installed on a server 11 and a client terminal 12. Such programs are stored in RAM, ROM, hard disk device, etc. provided on the server 11 or the client terminal 12, or read out from the corresponding recording medium by the CD-ROM apparatus, opto-magnetic disk apparatus, floppy disk apparatus, etc., or down-loaded from the host via the communication line. Such programs may be prepared so as to be operable under UNIX, Microsoft's MS-DOS, Windows, and various other OS, system environments, or platforms.

FIG. 2 is a block diagram of the electronic settlement system 1 according to the present invention. The system to be explained on an assumption of electronically settling a circulating document for approval by plural managers in a certain company.

In FIG. 2, the electronic settlement system 1 comprises a server 11 and a large number of client terminals 12a, 12b, 12c, 12d, . . . All or a part of the client terminals 12a, 12b, 12c, 12d, . . . may be described as "client terminal 12".

In the server 11 there are stored a circulating approval document file 21, a reference voice file 22, a settling voice file 23, a voice comment file 24, a renewal log file 25, and a transmission log file 26.

The circulating approval document file 21 is a file for storing the data of the circulating approval document prepared by the person in charge of drafting on the screen of the client terminal 12. When the prepared circulating approval document is sent around to the related persons in charge of settlement and the respective settlements have been made, the data relating to those settlements are also stored. The data of a circulating approval document contained in the circulating approval document file 21 may be described simply as "circulating approval document".

As shown in FIG. 3, the circulating approval document file 21 has items of a circulating approval document number NSA, a name of an item to be subjected to circulating approval SSA, a drafting department DDR, a person in charge of drafting NDR, contents of circulating approval CSA, an amount required to be settled ASA, a settling person PSA, a settling date TAP, a pattern name PTN, a settling voice file name FSD, and a voice comment file name FCO, etc.

In blanks of the circulating approval document number NSA, the name of the item to be subjected to circulating approval SSA, the drafting department DDR, the person in charge of drafting NDR, the contents of circulating approval CSA, and the amount required to be settled ASA, the contents inputted in preparing the circulating approval document are written. Who should become the settling person PSA, namely, the settlement route, is automatically determined by the known method according to the amount of money, at the time of the writing of the amount required to be settled ASA. In blanks of the pattern name PTN, the settled voice file name FSD, the settling date TAP, and the voice comment file name FCO, data is written at the time of the settlement by each settling person PSA.

The reference voice file 22 is the file of the individual reference voice patterns of all employees who are considered to have possibilities to be the settling persons PSA, which are to be used in settlement and are registered in advance. Here, in order to give either a command of "approval" or "rejection" on the settlement of the circulating approval document to the electronic settlement system 1, each person is to register three reference voice pattern corresponding to each command. The respective reference voice passwords are stored in a manner to correspond to respectively different pattern names for each command.

Namely, as shown in FIG. 4, in the reference voice file 22, there are provided the items such as an employee number NEM of the settling person, the pattern name PTN to be used as the identification code of the present invention, the pattern contents CPT which is a reference voice pattern, a registration date TRG, and a date of renewal TRN.

As to the pattern name PTN, there are provided three kinds of reference voice patterns, each of 1 to 3, for each of "approval" and "rejection", or 6 kinds of references voice patterns in total of the pattern name PTN. With respect to the respective pattern name PTN, the settling person may register by voice the pattern contents CPT (reference voice pattern) optionally determined by the settling person. The pattern name PTN may be, for example, for the reference voice pattern of approval, simple reference voice patterns such as "approve", "approved", "OK", those including numbers such as "approval 1", "approval 2", one accompanying the name or post of the settling person such as "approved by - - - ", such as "fine weather today". The examples for the rejection reference voice pattern include simple ones such as "reject", "rejected", "no", those including numbers such as "rejection 1", "rejection 2", one accompanying the name or post of the settling person such as "rejected by - - - ", or even an arbitrary reference voice pattern such as "cloudy weather today". The pattern contents which form the voice patterns set forth above may each be described as from an inputted "password".

The registration date TRG is the date at which the respective pattern contents CPT is registered for the first time. The renewal date TRN is the date at which the pattern contents CPT is renewed. The initial registration of the pattern contents CPT is to be made by each employee by using any client terminal 12, witnessed by the responsible person for operation other than the supervisor of the electronic settlement system 1. In such case, each person who is going to make a registration optionally determines own pattern contents CPT, and memorizes them, but conceals the pattern contents CPT to others. Renewal of the pattern contents CPT is made by replacing, at the time of the settlement, the referenced pattern contents CPT with the voice uttered then by the settling person PSA.

The settling voice file 23 is a file for storing the voice password as output from the microphone 125 in response to the voice uttered by each settling person PSA, and in response to the pattern name displayed on the screen as described later. The voice password is stored, in settling the circulating approval document such that the voice password corresponds to the settled circulating approval document.

As shown in FIG. 5, the settling voice file 23 includes the items of a circulating approval document number NSA, the employee number NEM, a settling voice password SDC, and the settlement date TAP. The settling voice password SDC is one made by converting the voice uttered by the settling person PSA to a digital voice signal inputted by microphone 125. The voice signal (issued from the settling person PSA) is not recorded as such but the signal is scrambled on the basis of the date and is then recorded.

Here, explanation is given on an example of scrambling. As shown in FIG. 9, of the data of voice password SDCa issued from the settling person PSA, the data Dch of 14 bytes in total at the 14 spots determined by the logic randomized on the basis of the date (settlement date TAP) are replaced with the data Dtm of that date, and stored in the settling voice file 23 as the settling voice password SDC. The original 14-bytes data Dch which have been replaced are put to the reserve region and kept under control.

By this construction, should it be the case for the settling voice password SDC having been illegally copied, it becomes impossible to reproduce such copy normally, so that the illegal use is prevented.

The voice signal comment file 24 is a file to store the voice of comment by the settling person PSA in a manner to correspond to the settled circulating approval document. In other words, the settling person PSA can input the signal as the comment in settling after the input of the settling voice password SDC. In case of the input of the voice comment, said input is stored in the voice comment file 24. However, this applies only to the case where the settling voice password SDC is judged to be genuine.

In FIG. 6, the voice comment file 24 includes the items of the circulating approval document number NSA, the employee number NEM, the settlement date TAP, and a voice comment SCO. The voice signal comment SCO is the one made by converting the voice received by microphone 125 from the settling person PSA to the digital voice signal. An upper limit is provided for the time length of the voice comment, for example, to be within 30 seconds for one comment.

The renewal log file 25 is a file for taking a record to the effect that the renewal is made when the pattern contents CPT of the reference voice file 22 are renewed. As described above, the renewal of the pattern contents CPT is executed when the settlement is made by referring to the pattern contents CPT. By making renewal of the pattern contents CPT, notwithstanding the change by time of the voice signal of the settling person PSA, the pattern contents CPT can be always maintained to the latest voice of the settling person PSA.

In FIG. 7, the renewal log file 25 has the items of the employee number NEM, the renewal date TRN, the pattern name PTN, and the circulating approval document number NSA which became the occasion for renewal. Based on the renewal log file 25, the renewal condition of the pattern contents CPT by each settling person is printed for example at certain time every day, and its appropriateness is checked by the person responsible for operation.

The transmission log file 26 is a file for recording the locus of transmission of the circulating approval document. Writing in the transmission log file 26 is made at the time when the settlement to the circulating approval document is made by a certain settling person PSA and the data renewal in the circulating approval document file 21 or the reference voice file 22 is made by said settlement.

In FIG. 8, the transmission log file 26 includes the items of the circulating approval document number NSA, a post PST of settling person PSA, a name NME thereof, the employee number NEM thereof, the settlement date TAP, the pattern name PTN, an approval/rejection flag GDC, and a voice abnormality flag GEX.

The voice abnormality flag GEX is the alarm information of the case where the voice for settlement was issued by the settling person PSA but its identification has been impossible. Based on the transmission log file 26, the settlement condition in each circulating approval document is printed for example every day at a certain time to enable the responsible person for operation to check its adequacy.

The server 11 is provided with an external memory for storing the file as above, a processor, a display, a keyboard, a mouse, a microphone, a speaker, and a communication controller, etc.

For the client terminal 12, a personal computer, a work station, or the like is used. Though each client terminal 12 is not specifically used exclusively for a particular person, it is installed for example on the desk of each settling person PSA so as to be usable by each settling person PSA. Each client terminal 12 is equipped with a processor 121, a display 122, a keyboard 123, a mouse 124, a microphone 125 for inputting voice, and a speaker 126. The program for performing the predetermined processing is recorded on the floppy disk FD to be loaded on the client terminal 12 or on the hard disk at the server 11 or the client terminal 12.

Figure 14:
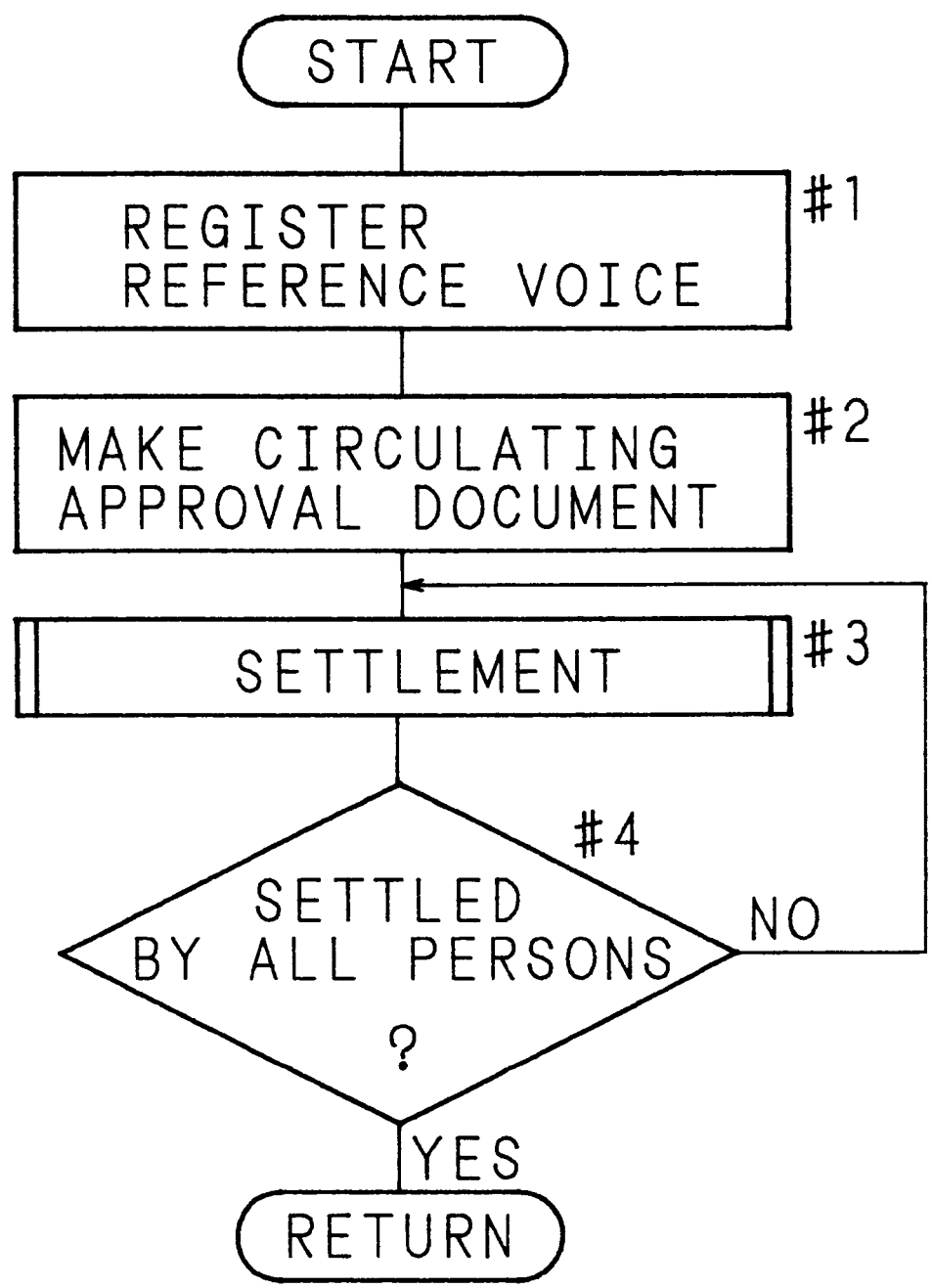
FIG. 14 is a flow chart showing a whole processing procedure.
Figure 15:
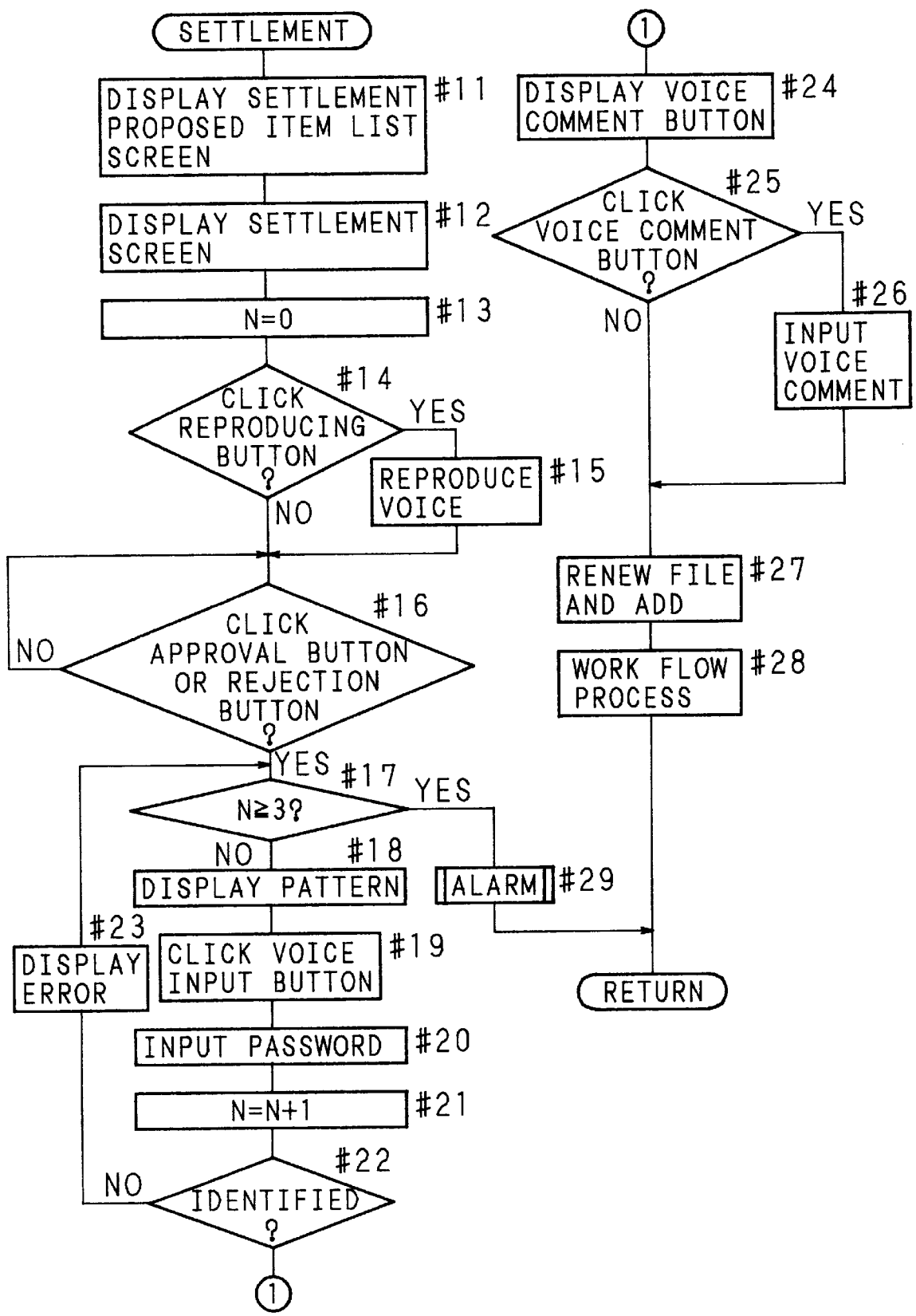
FIG. 15 is a flow chart showing a procedure for settlement processing.
Figure 16:
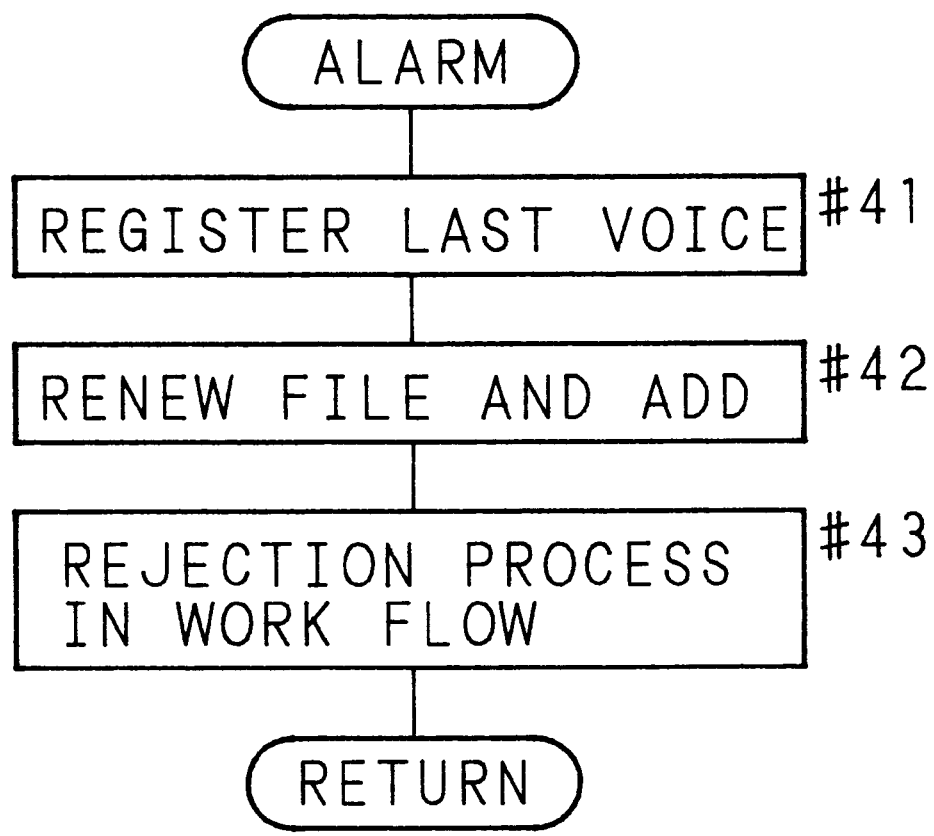
FIG. 16 is a flow chart showing an alarm processing procedure.

Next, the flow of processing or operation in the electronic settlement system 1 is explained on the basis of the screens HG (FIGS. 10–13) displayed on the display 122 at the client terminal 12 and flow charts (FIGS. 14–16).

FIG. 14 is a flow chart to show the whole processing or flow of operations. In utilizing the electronic settlement system 1, the reference voice pattern of each settling person PSA (pattern contents CPT) is registered in the reference voice file 22 before operation (#1).

Figure 10:
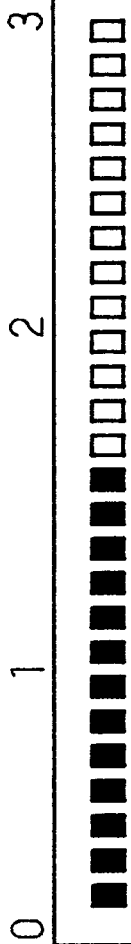
FIG. 10 is a view showing a reference voice registration screen.

The person desiring to register the voice reports that effect to the responsible person for operation. The responsible person for operation causes to display a reference voice registration screen HG1 as shown in FIG. 10 on the client terminal 12 provided on the own desk of the person desiring to register, by using the own ID code and password of the responsible person for operation. In other words, only the responsible person for operation can open the screen HG1.

By inputting the employee number NEM of the person desiring to register and clicking any pattern name PTN, registration of the clicked pattern name PTN can be made. FIG. 10 shows the screen HG1 in the state where the registration of the patterns 1 and 2 for approval has been completed and the registration of the pattern 3 for approval is in progress. One pattern contents (password) CPT is set to be a certain duration, for example, not exceeding 3 seconds.

In the time bar displayed on the lower part of the screen HG1, the white square zone changes to the black square zone with time. Therefore, the voice password must be uttered completely before the whole zone turns to black color. The voice password inputted through the voice microphone 125 is registered in the reference voice file 22, with simultaneous recording of the registration date TRG.

The person in charge who wants to obtain settlement inputs an ID code and password, etc. by operating the client terminal 12 to display a circulating approval document making screen HG2 as shown in FIG. 11 on the display 122, and inputs the necessary data to complete the circulating approval document (#2).

The circulating approval document making screen HG2 is displayed on the basis of the contents of the circulating approval document file 21 shown in FIG. 3. The person in charge inputs on the screen HG2 the items of the circulating approval document number NSA, the circulating approval item name SSA, a circulating approval contents CSA, the amount required to be settled ASA, the drafting department DDR, and the person in charge of drafting NDR. According to the amount required to be settled ASA, the settling persons PSA, namely, settlement route, is automatically determined by the known work flow control. Here is shown the case where the settling persons PSA are three of a section head, a department manager, and an executive director. Accordingly, the settlement route is in this order, and the circulating approval document is additionally described in this order on the screen of the list of the proposed items of settlement and transmitted. The completed circulating approval document is stored in the circulating approval document file 21.

Next, the settlement processing is made (#3). When the settlements by all the persons to make settlement are over, the processing is completed (Yes in #4).

Next, the settlement processing (#3) is explained with reference to FIG. 15.

The person who wants to make settlement optionally operates the client terminal 12 to have its display 122 display the screen HG3 of a list of the proposed items of settlement as shown in FIG. 12 (#11). On the screen HG3 of a list of the proposed items of settlement as shown in FIG. 12, there are displayed the circulating approval document number NSA to be settled by the principal, the circulating approval item name SSA, the amount required to be settled ASA, a person who made settlement immediately before NJB, and a final date of settlement TFN. The settling person PSA selects one out of the proposed items of settlement displayed on the screen HG3 and clicks to display the settlement screen HG4 as shown in FIG. 13 (#12). And the identification frequency number N is initialized (N=0) (#13).

The settlement screen HG4 shown in FIG. 13 shows a condition where the circulating approval document of the number "3456", having already been settled by the section head, is transmitted to the department manager who is the settling person PSA. In this screen HG4, when it is desired to hear a settling voice password SDC of the section head or the preceding settling person, an illustrated button of the corresponding place of the column of a settlement condition CDT must be clicked. When it is desired to hear the comment, an illustrated button of the corresponding place of the column of a voice comment COM must be clicked (#14). Then, the corresponding settling voice password SDC or the voice comment SCO is read out from the settling voice file 23 or the voice comment file 24 and reproduced by voice from the speaker 126 (#15).

In this way, as it is possible to hear the original voice of the previous settling person according to the contents of settlement, it can be easily confirmed that the contents of settlement by the predecessor were correct, and improvement of reliability of the electronic settlement system 1 can be expected.

Now, in order for the department manager who is the settling person PSA to make settlement, he is to click either "approved" or "rejected" in the column of the settling condition CDT (Yes in #16). Here, it is assumed that "approved" has been clicked. Then, in order to urge input of the password on approval, the settling voice input button BT11 is displayed on the screen HG4 so as to make it possible to recognize the pattern name PTN (#18). Here, display is made so as to input the approval pattern 3.

The settling person PSA clicks the settling voice input button BT11, after that, he issues the password of the approval pattern 3 to the microphone 125 (#20). Here, he says "approve" to make input. The inputted password and the pattern contents CPT on the related settling person PSA registered in the reference voice file 22 are collated by voiceprint and identification is made.

In case of the failure of identification, i.e., when it is not identified to be the principal (No in #22), indication to that effect is made in the region WD11 (#23), and the sequence returns to the step #17 to repeat the input of the password. However, if the failure of identification repeats three times (Yes in #17), then it becomes impossible to input voice password and alarm processing takes place (#29) to process the settlement for rejection, and the step returns to the screen of the list of the proposed items of settlement HG3 shown in FIG. 12.

When the identification has been successful, namely, when judgment has been made to be the principal (Yes in #22), there is displayed in the column of the settlement condition CDT for example as "voice approval by department manager - -", and the date of the approval is displayed in the column of the date of settlement TAP. In such a case, for example, an illustration of the previously registered seal may be displayed in the column of the settlement condition CDT.

And, a voice comment button BT12 is displayed on the screen HG4 (#24). When desiring to input a comment, the settling person PSA clicks the voice comment button BT12 (Yes in #25), and then issues a comment to the microphone 125 (#26).

The data based on the command or voice inputted in the screen HG4 are written in the circulating approval document file 21. By the password inputted in the current settlement, the pattern contents CPT of the reference voice file 22 is renewed. Also, scrambling is applied to the inputted password, and it is stored in the settling voice file 23 as the settling voice password SDC. In case of the comment made, such comment is stored in the voice comment file 24 as the voice comment SCO. Also, the information based on the progress up to the current settlement is additionally recorded in the renewal log file 25 and the transmission log file 26 (#27).

In case of the approval, approval processing is made, and in case of the rejection, rejection processing is made, respectively in the work flow processing (#28). By this step, this circulating approval document is additionally described in the screen of a list of proposed items of settlement by the executive director which is the next settling person PSA.

FIG. 16 is a flow chart showing the procedures for the alarm processing (#29). In the alarm processing, for the purpose of the subsequent follow-up search, the voice inputted lastly is stored in the settling voice file 23 (#41). The circulating approval document file 21 is renewed, and additional description is made of the renewal log file 25 and the transmission log file 26 (#42). In the work flow processing, the rejection processing is made (#43).

According to the electronic settlement system 1 as described above, the settling person PSA is identified by voiceprint collation using voice, and settlement can be made by this process. Accordingly, identification of the principal can be made with assurance, and the operation is easy. Moreover, there are provided three kinds of the passwords to be uttered by the settling person PSA, and which password of them is to be uttered is designated by the electronic settlement system 1 by random selection, so that it is almost impossible for the third person to make settlement by illegal means, and the reliability of the electronic settlement system 1 is remarkably improved.

Further, as the password uttered by the settling person PSA is subjected to scrambling and stored in the settling voice file 23, even when the stored settling voice SDC is illegally copied, it is impossible to reproduce such copied voice normally, and reliability of the system is maintained. Also, because the pattern contents CPT of the reference voice file 22 is renewed by the password in the case of the settlement, it does not occur for the voiceprint collation to become impossible for the cause, if any, of the change by time of the voice of the settling person PSA. Accordingly, there is no necessity to make periodical re-registration of the pattern contents CPT of the reference voice file 22. Furthermore, since the pattern contents CPT is renewed on each occasion of use, old voice becomes unusable in the course of time. Therefore, even if old voice is copied, its illegal use is prevented.

In the embodiment described above, there are registered three kinds of password respectively on "approved" and "rejected", but they may be two kinds or more than three kinds. The contents of the password can be optionally determined in addition to those described above. Such password may be applied to various contents of settlement other than "approved" and "rejected". The contents to be displayed on the settling voice input button BT11 as the mode of the output of the identification code can be various ones including the name, number, code, color, pattern, character, illustration, etc. Besides the indication on the settling voice input button BT11, the identification code may be displayed on the position separate from the said button. Alternatively, without making indication on the screen HG4, output may be made in voice. Instead of clicking the mouse 124, the command input may be made by voice. Registration of pattern contents CPT, preparation of circulating approval document, etc. were carried out at the client terminal 12, but the same may be made on the server 11.

In the embodiments mentioned above, settling person, settlement contents, display contents and display method on the settling voice input button BT11, the voice comment button BT12, etc., contents of circulating approval document, and other contents and method of display on the screen HG, contents or sequence of processing, constitution of the server 11 or the client terminal 12, constitution of the whole electronic settlement system 1, etc. can be optionally modified according to the purport of the present invention.

The electronic settlement system of the present invention is applicable as the electronic settlement system for various documents which require settlement other than the circulating approval document. Also, the principal identifying method of the present invention is applicable to the security protection of the chart in hospital, various other security protections, or various identifications.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A principal identification method for authorizing a decision maker to make a decision with regard to a particular subject, comprising the steps of:

storing a plurality of different reference voice patterns in correspondence with a plurality of different identification codes, respectively;

selecting one of the identification codes for a command to a computer;

indicating an input of a voice password corresponding to the selected one identification code;

inputting a voice password from a decision maker;

judging whether the inputted voice password is coincident with a corresponding stored reference voice pattern corresponding to the selected one identification code; and authorizing a decision of the decision maker and storing the decision in association with an electronic document upon determining in said judging step that the inputted voice password is coincident with the corresponding stored reference voice pattern.

2. The principal identification method according to claim 1, wherein the corresponding inputted voice password is the decision of the decision maker.

3. The principal identification method according to claim 1, further comprising:

a voice file for storing, in correspondence with contents required to be approved, the inputted voice password inputted at the time of decision by the decision maker in correspondence with the selected one identification code as a new voice pattern;

voice output means for outputting the corresponding reference voice pattern from the voice file corresponding to the selected one identification code; and voice selection means for selecting the corresponding reference voice pattern to be outputted to said voice output means to thereby instruct the output.

4. The principal identification method according to claim 3, further comprising:

scrambling means for scrambling the inputted voice password of the decision maker with a coding based upon the time of approval and storing the scrambled voice password in the voice file as the new voice pattern.

5. The principal identification method according to claim 3, further comprising:

a voice comment file for storing a voice signal inputted by the decision maker as a voice comment and the contents required to be approved;

comment input indicating means for indicating that the inputted voice signal is a comment;

voice comment output means for outputting the contents from the voice comment file by voice; and voice selecting means for selecting the voice comment to be outputted from said voice comment output means to thereby instruct the output.

6. The principal identification method according to claim 4, further comprising:

a voice comment file for storing a voice signal inputter by the decision maker and the contents required to be approved;

comment input command means for commanding the decision maker to input that a voice signal to be inputted is a voice comment;

voice comment output means for outputting the contents of the voice comment file by voice; and voice selecting means for selecting the voice comment to be outputted from said voice comment output means to thereby instruct the output.

7. A principal identification method, comprising the steps of:

selecting one of a plurality of different identification codes for a command to a computer, wherein a plurality of different reference voice patterns are stored in correspondence with the plurality of different identification codes, respectively;

indicating an input of a voice password by a decision maker for the selected one identification code;

inputting a voice password from the decision maker;

collating the inputted voice password with a corresponding stored reference voice pattern corresponding to the selected one identification code, to thereby judge whether the inputted voice password is coincident with the corresponding stored reference voice pattern; and authorizing a decision of the decision maker and storing the decision in association with an electronic document upon determining in said judging step that the inputted voice password is coincident with the corresponding stored reference voice pattern.

8. A principal identification apparatus, comprising:

voice inputting means for inputting a voice password of a decision maker;

a reference voice file for storing a plurality of different reference voice patterns in correspondence with a plurality of different identification codes, respectively;

identification code output means for outputting one of the identification codes in a manner to be recognizable by the decision maker;

judging means for judging whether the inputted voice password by coincides with a corresponding reference voice pattern corresponding to the one identification code with collation;

storing means for storing a decision of the decision maker in association with an electronic document upon judgment by said judging means that the inputted voice password is coincident with the corresponding reference voice pattern.

9. An electronic identification system for a decision maker who is required to make a decision regarding contents displayed on a screen, comprising:

voice inputting means for inputting a voice password of the decision maker;

a reference voice file for storing a plurality of different reference voice patterns of a plurality of different persons in correspondence with a plurality of different identification codes, respectively;

contents selecting means for selecting contents which are required to be decided on the basis of data inputted by the decision maker;

identification code output means for outputting one of the identification codes corresponding to and recognizable by the decision maker when the contents are selected;

judging means for collating the inputted voice password inputted by said voice inputting means with a corresponding reference voice pattern corresponding to the one outputted identification code, to thereby judge coincidence; and processing means for associating data input by the decision maker in association with an electronic document upon judgment by said judging means that the inputted voice password is coincident with the corresponding reference voice pattern.

10. An electronic identification system according to claim 9, further comprising:

file renewal means for renewing the corresponding reference voice pattern in the reference voice file with the inputted voice password of the decision maker in response to the processing made by said processing means.

11. An electronic speaker identification system having a plurality of client terminals and a server connected to each of the client terminals through a network, for approving contents of an electronic document required to be displayed on a screen by each client terminal, comprising:

voice inputting means for inputting a voice password of a decision maker;

a reference voice file for storing a plurality of different reference voice patterns of a plurality of corresponding different persons in correspondence with a plurality of different identification codes, respectively;

contents selecting means for selecting contents of an electronic document which are required to be approved on the basis of data inputted by the decision maker;

identification code output means for outputting one of the identification codes corresponding to and recognizable by the decision maker when the contents are selected;

judging means for collating the voice password inputted by said voice input means with a corresponding reference voice pattern corresponding to the one outputted identification code to judge coincidence; and processing means for associating the data inputted by the decision maker in association with the electronic document upon judgment by said judging means that the inputted voice password is coincident with the corresponding reference voice pattern.

12. A recording medium on which a computer readable program is recorded for identifying a decision maker who operates the computer, said computer having a screen and voice input means, said program comprising the steps of:

storing a plurality of different reference voice patterns respectively corresponding to a plurality of different persons and a plurality of different identification codes;

selecting one of the identification codes by the computer;

displaying the selected identification code on the screen;

judging whether a voice password inputted in correspondence with the displayed identification code coincides with a corresponding stored reference voice pattern corresponding to the selected one identification code by collating; and authorizing a decision of the decision maker and storing the decision in association with an electronic document upon determining in said judging step that the inputted voice password is coincident with the corresponding stored reference voice pattern.

13. A recording medium on which program code means readable by a computer are recorded for identifying a decision maker who operates the computer, said computer having a screen and voice input means, said program code means comprising:

program code means for causing the computer to store a plurality of different reference voice patterns respectively corresponding to a plurality of different persons and to a plurality of different identification codes;

program code means for causing the computer to select one of the identification codes;

program code means for causing the computer to display the selected one identification code on the screen and command input of a voice password from the decision maker;

program code means for causing the computer to judge whether the inputted voice password coincides with a corresponding stored reference voice pattern corresponding to the selected one identification code by collating; and program code means for authorizing a decision of the decision maker and storing the decision in association with an electronic document upon determining that the inputted voice password is coincident with the corresponding stored reference voice pattern.

14. A recording medium on which program code means readable by a computer are recorded for identifying a decision maker who operates the computer, said computer having a screen, a keyboard and voice input means, said program code means comprising:

program code means for causing the computer to display a reference voice registration screen and command the input of an identification code on the basis of a predetermined key input;

program code means for causing the computer to command the input of a voice password of each of a plurality of different persons on the basis of input of corresponding identification codes;

program code means for causing the computer to store the inputted voice passwords as reference voice patterns in correspondence with the inputted identification codes;

program code means for causing the computer to display completion of registration on the screen when the plurality of different reference voice patterns are stored;

program code means for causing the computer to select one of the identification codes on the basis of a predetermined key input;

program code means for causing the computer to display the selected one identification code on the screen and to command input of a corresponding voice password from a corresponding person;

program code means for causing the computer to retrieve a corresponding stored reference voice pattern corresponding to the selected one identification code;

program code means for causing the computer to collate the inputted voice password in correspondence with the selected one identification code and the corresponding retrieved reference voice pattern;

program code means for causing the computer to judge that the corresponding person is a decision maker when coincidence is obtained as a result of the collation;

program code means for causing the computer to complete the identification processing when no coincidence is obtained as a result of collations which are repeated for a predetermined number of times; and program code means for authorizing a decision of the decision maker and storing the decision in association with an electronic document upon determining that the inputted voice password is coincident with the corresponding retrieved reference voice pattern.

15. A recording medium on which a computer readable program is recorded for contents required to be approved using a computer, said computer having a screen and voice input means, said program comprising the steps of:

storing a plurality of different reference voice patterns respectively corresponding to each of a plurality of different persons and respectively corresponding to each of a plurality of different identification codes;

selecting one of the identification codes by the computer;

displaying the selected identification code on the screen and commanding input of a corresponding voice password;

judging whether the inputted voice password coincides with a corresponding stored reference voice pattern corresponding to the selected identification code by collating; and authorizing a decision of a decision maker and storing the decision in association with an electronic document in case of coincidence.

16. A recording medium on which program code means are recorded for contents required to be approved, and readable by a computer, said computer having a screen and voice input means, said program code means comprising:

program code means for causing the computer to store a plurality of different reference voice patterns respectively corresponding to a plurality of different persons and respectively corresponding to a plurality of different identification codes;

program code means for causing the computer to select one of the identification codes;

program code means for causing the computer to display the selected identification code on the screen and to command the input of a corresponding voice password;

program code means for causing the computer to judge whether the inputted voice password coincides with corresponding reference voice pattern corresponding to the selected identification code by collating; and program code means for authorizing a decision of a decision maker and storing the decision in association with an electronic document in case of coincidence.

17. A recording medium on which program code means are recorded for contents required to be approved, and readable by a computer said computer having a screen, a keyboard and voice input means, said program code means comprising:

program code means for causing the computer to display a reference voice registration screen and to command the input of identification codes on the basis of a predetermined key input;

program code means for causing the computer to command the input of voice passwords on the basis of the inputted identification codes;

program code means for causing the computer to store the inputted identification codes and inputted voice passwords in correspondence;

program code means for causing the computer to display completion of registration on the screen when the plurality of different identification codes are stored in correspondence with the plurality of different reference voice patterns, respectively;

program code means for causing the computer to display the contents required to be approved and command the input of approval or rejection on the basis of a predetermined key input;

program code means for causing the computer to select one of the identification codes based on the input of approval or rejection;

program code means for causing the computer to display the selected one identification code on the screen and to command the input of a corresponding voice password;

program code means for causing the computer to retrieve a corresponding reference voice pattern corresponding to the selected one identification code from the stored reference voice patterns;

program code means for causing the computer to collate the corresponding inputted voice password with the corresponding reference voice pattern;

program code means for causing the computer to judge that a decision maker is identified when coincidence is obtained as a result of the collation;

program code means for causing the computer to execute processing of an input of approval or rejection of the contents when the decision maker is identified;

program code means for causing the computer to complete the identification processing when no coincidence is obtained as a result of collations repeated for a predetermined number of times; and program code means for authorizing a decision of the decision maker and storing the decision in association with an electronic document upon determining in said judging step that the corresponding inputted voice password is coincident with the corresponding reference voice pattern.

* * * * *

UNITED STATES PATENT AND TRADEMARK OFFICE
CERTIFICATE OF CORRECTION

PATENT NO.: 6,104,995
DATED : August 15, 2000
INVENTOR(S): Takashi SHIMADA, et al.

It is certified that errrors appear in the above-identified patent and that said Letters Patent is hereby corrected as shown below:

Col. 12, line 62, change "inputter" to --inputted--.

Col. 16, line 32, before "corresponding" insert --a--.

Signed and Sealed this

Twenty-fourth Day of April, 2001

*Attest:*

NICHOLAS P. GODICI

*Attesting Officer*  *Acting Director of the United States Patent and Trademark Office*